(12) United States Patent
Takagi et al.

(10) Patent No.: US 7,559,071 B2
(45) Date of Patent: Jul. 7, 2009

(54) BROADCASTING RECEIVER HAVING OPERATION MODE SELECTION FUNCTION

(75) Inventors: Toshihiro Takagi, Takatsuki (JP); Manabu Yamamoto, Mukou (JP); Yasuhiro Inui, Yao (JP); Takahiro Katayama, Daito (JP); Yusuke Nishida, Ikoma (JP)

(73) Assignee: Funai Electric Co., Ltd., Daito-shi (JP)

( * ) Notice: Subject to any disclaimer, the term of this patent is extended or adjusted under 35 U.S.C. 154(b) by 1547 days.

(21) Appl. No.: 10/071,196

(22) Filed: Feb. 11, 2002

(65) Prior Publication Data
US 2002/0112248 A1 Aug. 15, 2002

(30) Foreign Application Priority Data
Feb. 9, 2001 (JP) ............................. 2001-034129

(51) Int. Cl.
*H04N 5/445* (2006.01)
(52) U.S. Cl. ..................... 725/46; 725/47; 715/811
(58) Field of Classification Search ............. 725/37–47; 715/811, 788, 789
See application file for complete search history.

(56) References Cited

U.S. PATENT DOCUMENTS

| 5,005,084 | A | * | 4/1991 | Skinner | 348/734 |
|---|---|---|---|---|---|
| 5,031,045 | A | * | 7/1991 | Kawasaki | 348/732 |
| 5,317,403 | A | * | 5/1994 | Keenan | 725/38 |
| 5,644,354 | A | * | 7/1997 | Thompson et al. | 725/138 |
| 6,177,931 | B1 | * | 1/2001 | Alexander et al. | 725/52 |
| 6,481,011 | B1 | * | 11/2002 | Lemmons | 725/47 |
| 6,530,083 | B1 | * | 3/2003 | Liebenow | 725/46 |
| 6,973,621 | B2 | * | 12/2005 | Sie et al. | 715/720 |
| 7,149,969 | B1 | * | 12/2006 | Thrane | 715/523 |

FOREIGN PATENT DOCUMENTS

| JP | 04-48312 | 12/1987 |
|---|---|---|
| JP | 1-91330 | 6/1989 |
| JP | 08-097682 | 4/1996 |
| JP | 08-275078 | 10/1996 |
| JP | 08-331527 | 12/1996 |
| JP | 09-065294 | 3/1997 |

* cited by examiner

*Primary Examiner*—Christopher Kelley
*Assistant Examiner*—Timothy R Newlin
(74) *Attorney, Agent, or Firm*—Crowell & Moring LLP

(57) ABSTRACT

In a broadcasting receiver having a function to set and select an operation mode of the receiver for each user based on input by a plurality of users, the operation mode is selected for each user to make a user setting and stored in a memory in correlation with a predetermined input pattern of an operation key. When having received a user's input in the predetermined pattern, the receiver refers to the memory to select a user setting that corresponds to this input pattern, thus switching the operation mode. It is thus possible to identify the operation mode for each user in use by simple operations.

7 Claims, 9 Drawing Sheets

FIG. 4(a)

FONT IN USER 0 SETTING

CHANNEL ADDITION MENU

MAIN CHANNEL  SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |
| 4-2 | BBC | ATSC | Weather Information |

FIG. 4(b)

FONT IN USER 1 SETTING

CHANNEL ADDITION MENU

MAIN CHANNEL  SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |
| 4-2 | BBC | ATSC | Weather Information |

FIG. 5(a)

FONT SIZE IN USER 0 SETTING

CHANNEL ADDITION MENU

MAIN CHANNEL  SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |
| 4-2 | BBC | ATSC | Weather Information |

FIG. 5(b)

FONT SIZE IN USER 2 SETTING

CHANNEL ADDITION MENU

MAIN CHANNEL  SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |

FIG. 6(a)

FONT COLOR / BACKGROUND COLOR IN USER 3 SETTING

CHANNEL ADDITION MENU

MAIN CHANNEL / SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |
| 4-2 | BBC | ATSC | Weather Information |

FIG. 6(b)

FONT COLOR / BACKGROUND COLOR IN USER 0 SETTING

CHANNEL ADDITION MENU

MAIN CHANNEL / SUB-CHANNEL

| CH | STATION | Digital/Analog | Contents |
|---|---|---|---|
| 2-0 | CNN | NTSC | TV Program |
| 2-3 | CNN | ATSC | NEWS |
| 4-0 | BBC | NTSC | TV Program |
| 4-1 | BBC | ATSC | DATA Program |
| 4-2 | BBC | ATSC | Weather Information |

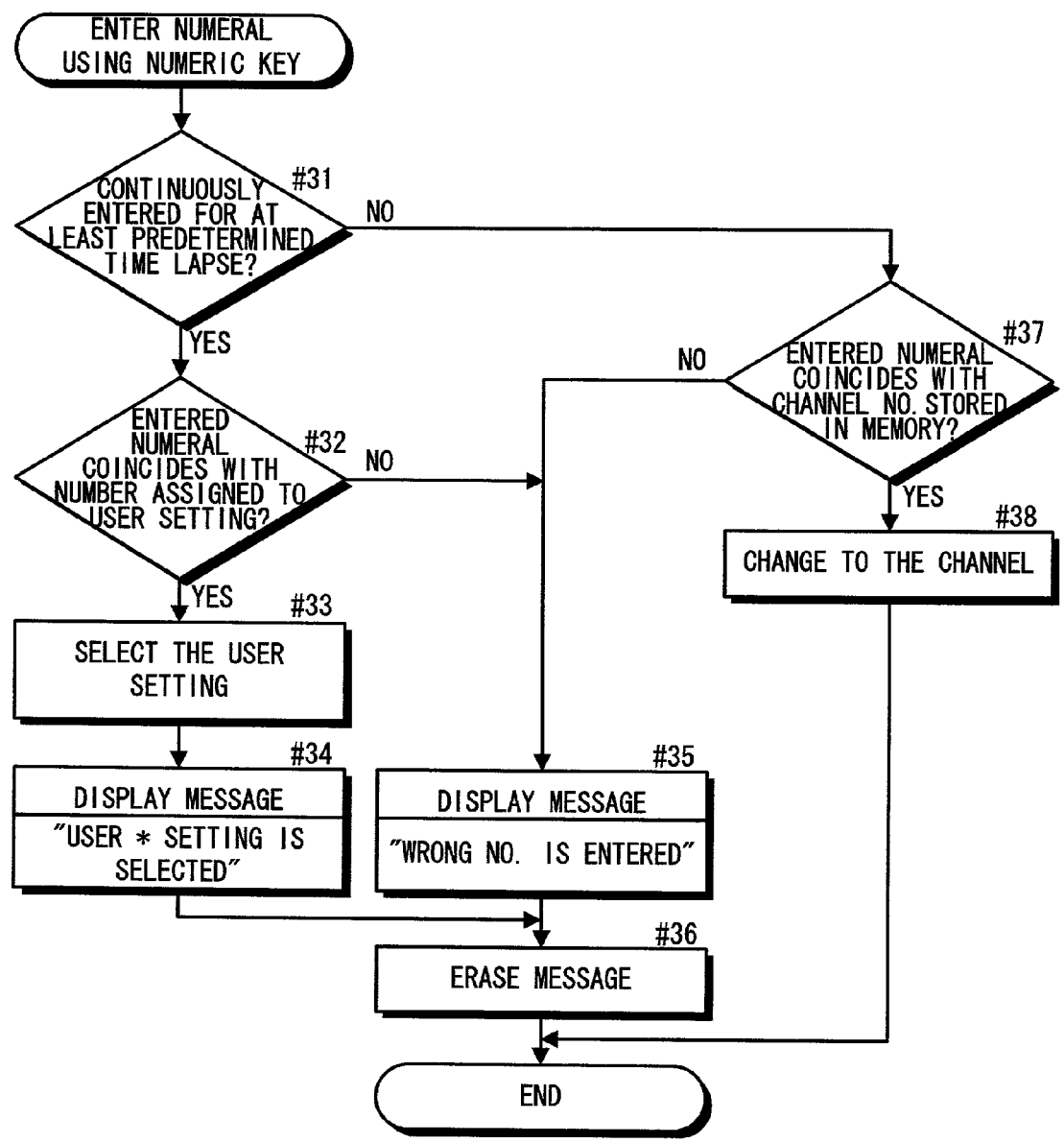

BROADCASTING RECEIVER HAVING OPERATION MODE SELECTION FUNCTION

BACKGROUND OF THE INVENTION

The present invention relates to a digital/analog broadcasting receiver having a function to select a user setting which defines the operation mode of this receiver for each of a plurality of users.

There has conventionally been such a broadcasting receiver that automatically sweeps tuner's reception frequencies to thereby store frequencies of receivable broadcasting waves in a preset memory (see, for example, Japanese Unexamined Patent Publication No. 8-97682). Also, there is such a broadcasting receiver that uses a PLL (Phase Lock Loop) frequency synthesizer to automatically sweep tuner's reception frequencies to thereby detect receivable frequencies and then store them in first memory sequentially and also to detect the receivable frequencies by manual tuning and then store them in second memory (see, for example, Japanese Unexamined Utility Model Publication No. 1-91330).

Also, there is such a broadcasting receiver for receiving a character information signal synchronized with voice to display it on a display that the signal can be displayed in such a display format as a font selected by a viewer (see, for example, Japanese Unexamined Patent Publication No. 8-331527). Also, there is such a broadcasting receiver capable of receiving a caption broadcast that creates character information from caption data to then display it on display device by adjusting a luminance signal or a color signal in a character region or a no-image region, thus improving user's visibility (see, for example, Japanese Unexamined Patent Publication No. 8-275078). Also, there is such a broadcasting receiver for receiving a character signal transferred in a data packet that displays a page header background color and a message background color which are different from each other to thereby enable easily discriminating between a page header sentence and a message (see, for example, Japanese Examined Patent Publication No. 4-48312). Also, there is such a broadcasting receiver that can display character information obtained through teletext broadcasting in any one of the three prime colors of red, green, and blue monochromatically, thus displaying the character information free of bleeding (see, for example, Japanese Unexamined Patent Publication No. 9-65294).

Further, recently, the broadcasting receiver has come to have more and more functions to thereby enable displaying the abovementioned character information containing channel information in a plurality of languages or outputting voice in a stereo or surrounded manner or in a plurality of languages. Also, the operation mode of such a receiver itself can be set corresponding to a user's demand.

Some prior art broadcasting receivers set channel information of a channel through which a broadcast is viewed for each of users and store it in a memory, thus displaying the user-specific channel information on a display. The operation mode of such a prior art receiver itself, however, cannot be set for each user and stored, so that even if the receiver is owned by, for example, a family to be used by a plurality of users of the family, the operation mode cannot be set for each of these users, thus providing poor ease-to-use.

Also, to select information set for each of a plurality of users like in the case of the above-mentioned channel information, such a procedure is necessary that comprises the steps of first operating, by the user, the operation keys on the input device such as a remote controller to display a menu list display on the display device, operating the direction key etc. to select and display a menu of interest, and selecting information of interest, so that the operations are troublesome and image display is interrupted when the menu list display etc. is displayed during these operations.

SUMMARY OF THE INVENTION

The present invention is made to solve the above-mentioned problems and it is an object of the present invention to provide a broadcasting receiver that the operation mode for each of a plurality of users can be set and selected by simple operations, when the receiver is owned by a plurality of users, so that the operation mode for each user thereof can be chosen without confusing.

In accordance with a feature of the invention, digital decoder is used to decode a broadcasting signal so that channel information contained in this signal can be stored in memory, which can be referenced to thereby recognize a receivable channel number. The user operates the input device beforehand to set his own preferential operation mode of the receiver and assign a desired selection number to operation mode and then store it in the memory. This selection number is assigned such a number that is not used as the receivable channel number obtained from the channel information so that they may be discriminated from each other. Also, the operation modes include such a mode that displays channel information for each user who views a broadcast. When the user operates the numeral inputting key to enter a selection number during reception of an image, the control unit refers to the memory to select an operation mode which is assigned this selection number. Note here that when the user has entered a channel number, the current channel is changed to the corresponding channel.

Thus, by using the numeral inputting key to enter a predetermined selection number, it is possible to select an operation mode which is set for each user including displaying of information of a channel for viewing. With this, therefore, the operation mode can be selected easily. Also, since the existing numeral inputting key is used to enter an operation mode selection, no new hardware needs to be assigned, thus suppressing down the manufacturing costs. Also, the selection number entered when the operation mode is selected can be assigned a number different from the channel number so that the user can discriminate the selection number and the channel number in operation. Further, this operation can be carried out only by using the numeral inputting key without displaying the menu display, so that it is unnecessary to interrupt the display of images output on the display device. Therefore, the user can select the operation mode while enjoying viewing the images simultaneously.

In accordance with another feature of the invention, channel information contained in a broadcasting signal decoded by the digital decoder is stored in the memory. The user operates the input device beforehand to set his own preferential operation mode of the receiver and also assign either one of the direction keys to this operation mode and then store it in the memory. The operation modes may include a mode for displaying the information of a channel for each viewing user. When the user presses any one of the direction keys with a predetermined operation held down, the control unit refers to the memory to select an operation mode which is assigned this direction key. Note here that if the predetermined operation key is pressed alone, a specific operation corresponding to this operation key is performed. Also, although the number of users who can set the operation mode is generally four corresponding to the UP/DOWN keys and the RIGHT/LEFT keys, more user's operation modes can be set by using a plurality of operation keys.

In accordance with a further feature of the invention, the user operates the input device beforehand to set his own preferential operation mode of the receiver and also assign a desired selection number to this operation mode and then store it in the memory. This selection number is to be a number assigned to the numeral inputting keys on the input device. Also, the operation modes may include such a mode that displays channel information for each viewing user. When the user holds down the numeral inputting key for at least a predetermined time lapse during the reception of an image, the control unit refers to the memory to select an operation mode which is assigned an entered selection number. Note here that if the numeral inputting key is held down for less than the predetermined time lapse, it is decided to be channel changing, so that the current channel is changed to the corresponding channel.

In accordance with a further feature of the invention, when channel information contained in the broadcasting signal is displayed on the display device in an OSD manner, it is possible to change a font type, size, or display color according to user's preference, thus customizing the OSD display. Also, if visibility is poor because a font display color and a background color are close to each other, the background color can be changed.

In accordance with a further feature of the invention, the user operates the input device beforehand to set his own preferential operation mode of the receiver and assign an input pattern of a desired numeral inputting key and then store it in the memory. This input pattern may be a number not used as the channel number or a number given by holding down the numeral inputting key for a predetermined time lapse. Also, a plurality of keys may be held down simultaneously instead. When the user presses the numeral inputting key in the above-mentioned pattern assigned beforehand during the reception of an image, the control unit refers to the memory to select an operation mode corresponding to this input pattern.

In accordance with a further feature of the invention, the user operates the input device beforehand to set his own preferential operation mode of the receiver and also assign either one of the direction keys to this operation mode and then store it in the memory. When the user presses any one of the direction keys with a predetermined operation key held down, the control unit selects an operation mode assigned this direction key. Note here that if the predetermined operation key is pressed alone, a specific operation that corresponds to this operation key is performed. Also, although the number of the users who can set the operation mode is generally four corresponding to the UP/DOWN keys and the RIGHT/LEFT keys, more user's operation modes can be set by using a plurality of operation keys.

BRIEF DESCRIPTION OF THE DRAWINGS

FIGS. 4(a) and 4(b) are illustrations for showing an OSD display on which channel information is displayed with a changed font in the receiver.

FIGS. 5(a) and 5(b) are illustrations for showing an OSD display on which the channel information is displayed with a changed font size in the receiver.

FIGS. 6(a) and 6(b) are illustrations for showing an OSD display on which the channel information is displayed with a changed font color and a changed background color in the receiver.

FIG. 9 is a flowchart for showing processing of the control unit when a key on the numeric key is pressed according to a further embodiment of the invention.

DETAILED DESCRIPTION OF THE PREFERRED EMBODIMENT OF THE PRESENT INVENTION

First Embodiment

Figure 1:
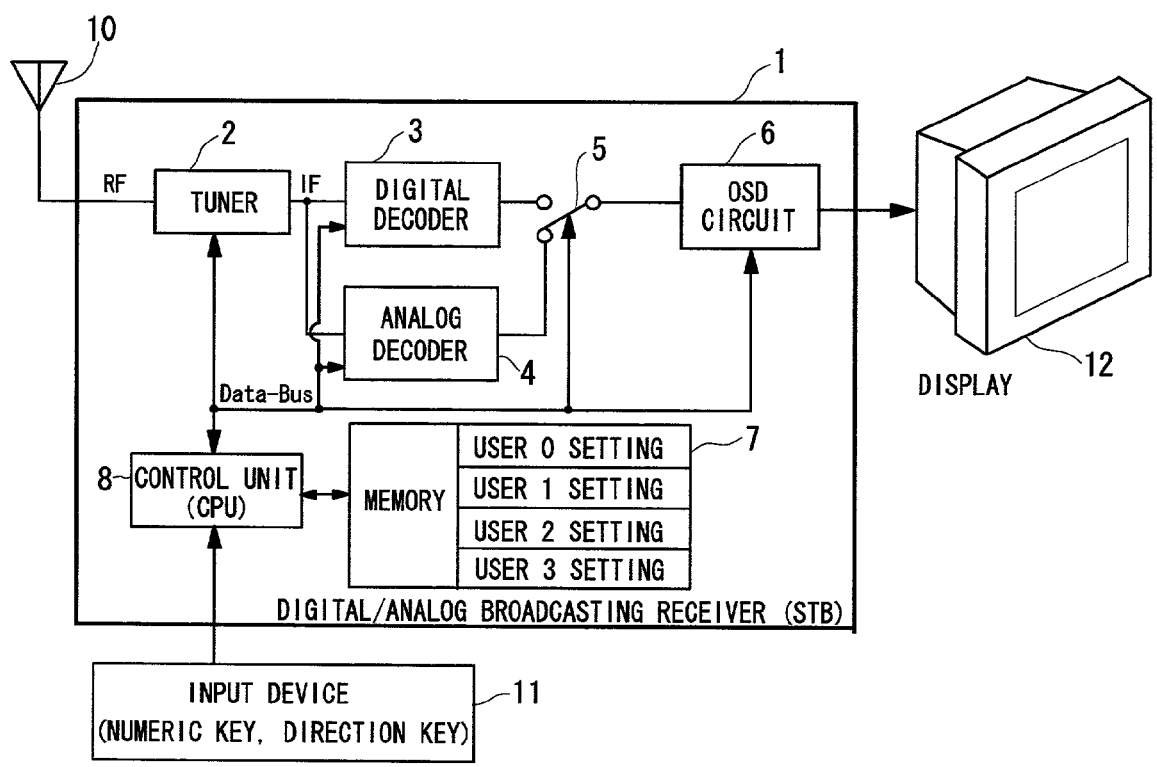
FIG. 1 is a block diagram for showing a broadcasting receiver according to one embodiment of the invention.

The following will describe a digital/analog broadcasting receiver related to one embodiment of the invention with reference to the drawings. FIG. 1 is a block diagram of the digital/analog broadcasting receiver. The receiver 1 is a set top box (STB) that receives at an antenna 10 an encoded radio-frequency (RF) digital/analog broadcasting signal originated from a TV broadcasting station to then display a list of the channel information which can be received by a display device 12 for displaying on a display an image signal contained in the broadcasting signal corresponding to operations for channel information display by the user by use of the body button or an input device 11 such as a later-described remote controller 30 shown in FIG. 2.

The receiver 1 comprises a tuner 2 for receiving a digital/analog broadcasting signal which is present in a frequency band corresponding to a desired channel, a digital decoder 3 and an analog decoder 4 for decoding the digital/analog broadcasting signal received at the tuner 2, a switch 5 for switching the broadcasting signals decoded by the digital decoder 3 and the analog decoder 4, an OSD circuit 6 for providing predetermined On-Screen Display (hereinafter abbreviated as OSD) at a display 12, a memory 7 for storing the originated frequencies of each digital broadcasting main channel and the channel configuration information, and a control unit 8 consisting of a CPU for controlling these sections of the receiver.

The tuner 2 is supplied with a digital/analog broadcasting signal received through the antenna 10 to then select a channel according to an instruction the user input to the control unit 8 from the input device 11 to thereby receive a digital/analog broadcasting signal of a frequency band corresponding to an input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, the physical channels are different even in digital broadcasting using a virtual channel headed by the same number as that of analog broadcasting, so that the broadcasting signals are originated in carrier waves of different frequency bands. If a user-selected channel is of digital broadcasting (if the sub-channels are not of number "0"), the broadcasting signal is decoded by the digital decoder 3. If the user-selected channel is of analog broadcasting (if the sub-channels are of number "0"), the signal is decided by the analog decoder 4.

The switch 5 receives an instruction from the control unit 8 to then output to the OSD circuit 6 a broadcasting signal decided by either the digital decoder 3 or the analog decoder 4. The OSD circuit 6 in turn receives an instruction from the control unit 8 to then output the broadcasting signal to the display 12 and also output an OSD display signal for displaying a list of the receivable channel information. The memory 7 stores the information of each channel's frequency band and the channel configuration information as well as the information of OSD display at the time of shipment of the receiver. Also, the memory 7 receives an instruction from the control unit 8 to thereby store the later-described operation modes set for each user as user 0 setting through user 3 setting.

The control unit 8 receives a user's input through the input device 11 to then control the sections through a data bus (Data-Bus) and cause the memory 7 to store the information of each channel's frequency band and the received channel information, thus referencing the information as occasion demands, for example, when a channel is selected.

Also, the control unit 8 receives a user's instruction for channel changing to then cause the tuner 2 to receive a broadcasting signal containing channel configuration information and then analyzes a VCT (Virtual Channel Table) given as the channel information obtained by decoding this broadcasting signal at the digital decoder 3, thus obtaining a status signal contained therein. This status signal contains all the digital/analog sub-channel information of a virtual channel. The control unit 8, therefore, can analyze that VCT to thereby obtain a virtual channel number consisting of the same number (main channel) as the previous channel number given to the same or the same system of broadcasting station originating the above-mentioned digital/analog broadcasting signal and a sub-channel number. That is, the control unit 8 can collectively obtain the digital/analog channel information originated from the same or the same system of broadcasting station. The control unit 8 stores thus obtained status signal in the memory 7, thus storing the channel information therein.

Further, the control unit 8, when having received a user's instruction, stores the later-described operation modes preset for each user as user settings in the memory 7 and selects (switches) the operation mode based on an operation-mode selection instruction sent from the user.

Still further, the control unit 8 decides presence/non-presence of the broadcasting signal based on the status signal to then provide predetermined OSD display or visually output a video program of a broadcast of a selected channel at the display 12. The display 12 may be a display of a television, a CRT, or a flat panel display such as an LCD (Liquid Crystal Display) or PDP (Plasma Display Panel). Although not shown, the receiver 1 is equipped with a D/A converter circuit for converting a digital signal into an analog one so that the signal for the OSD display or image display is converted by this D/A converter circuit into an analog signal and then output to the display 12. Also, the D/A converter circuit may be built in the display 12. Note here that to display contents on the flat panel display, the signal bypasses the D/A converter signal and is output as it is.

Figure 2:
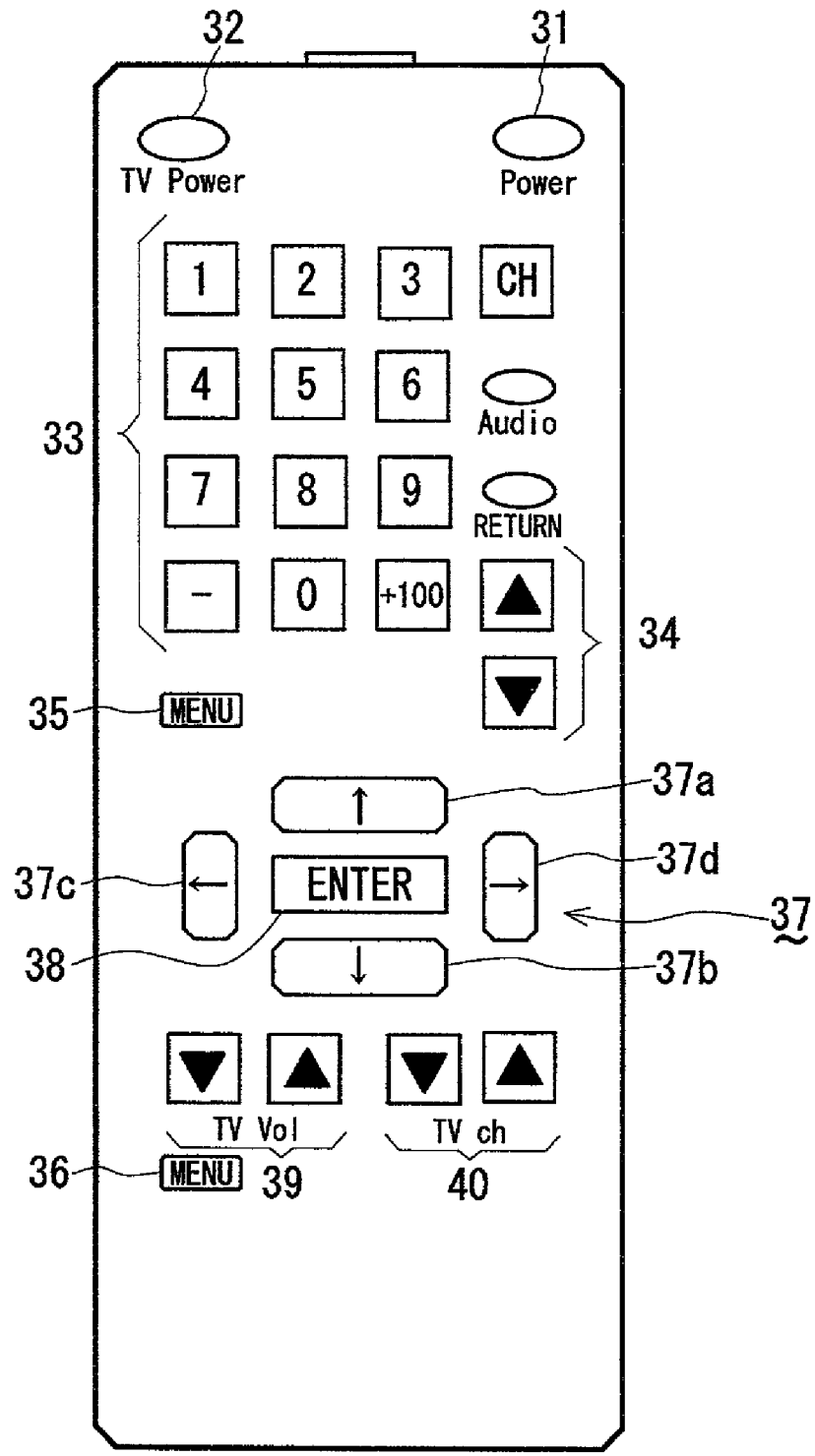
FIG. 2 is a plan view for showing a remote controller which is used in the receiver.

The input device 11 is used to input a user's instruction to the control unit 8. The input device 11 may come in the body button provided on the front panel of the receiver 1 or a remote controller 30 such as shown in FIG. 2. The remote controller 30 is configured to give an instruction in the form of an infrared ray etc. to operate the receiver 1 and the television. That is, the remote controller 30 comprises power keys 31 and 32 for turning ON and OFF respectively the power of the receiver 1 and the television, a numeric key 33 (numeral inputting keys) for inputting a channel number of the receiver 1, a channel UP/DOWN key pair 34 for changing the channel, menu keys 35 (operation key) and 36 for calling a menu display of the receiver 1 and the television respectively, direction keys 37 (37a-37d) for moving the cursor in any desired directions, an entry (ENTER) key 38 for assuring an input, a sound-volume UP/DOWN key pair 39 for adjusting a sound volume of the television, and a channel UP/DOWN key pair 40 for changing the television channel.

With this receiver 1, the user operates the remote controller 30 to set his own operation mode of the receiver and store it as a user setting in the memory 7 and also provides, through the remote controller 30, the control unit 8 with an instruction for user setting selection, thus switching the various operation modes of the receiver 1 to a mode defined as this user setting at a time. Note here that in this embodiment, an instruction for user setting selection is entered in a numeral using the numeric key 33.

Figure 3:
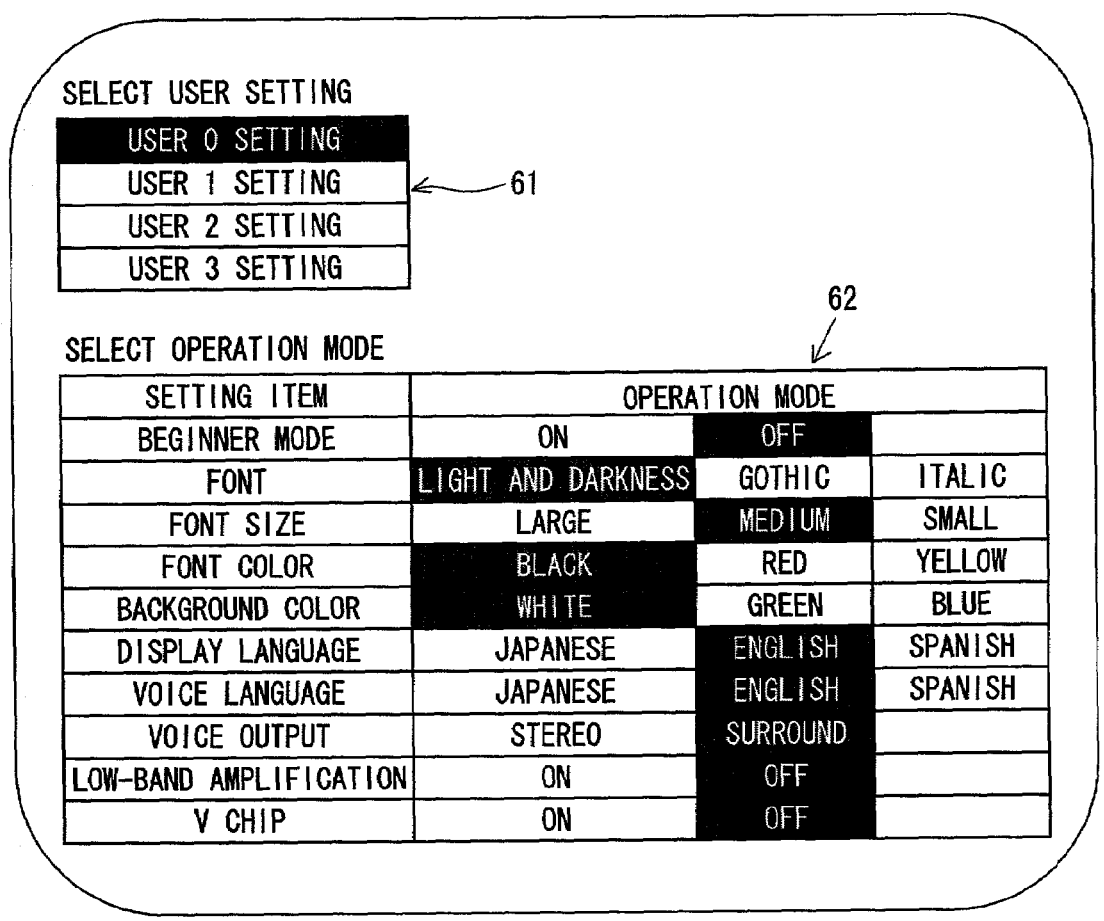
FIG. 3 is a illustration for showing a display on which user setting is made by selecting an operation mode for each user of the receiver.

This user setting in this embodiment is described with reference to FIG. 3. FIG. 3 shows a display for performing user setting by selecting the operation mode for each user, which display functions as an interface for user setting together with the remote controller 30. This operation-mode setting display is displayed in an OSD manner on the display device 12 by pressing the menu key 35 to display the menu in a list and then operating the direction keys 37 to select "OPERATION MODE SETTING" from the menu. On this setting display, first a user setting table 61 given at the upper part is used to select a user setting. Here, user 0 setting is selected, which is confirmed by a black-and-white reversed cursor. To select any one of the other user settings, operate the RIGHT/LEFT direction keys 37c/37d to move the cursor. When the user setting is thus selected and is confirmed by the ENTER key 38, such an operation mode selection table 62 appears at the bottom of the display that lists the various setting items and operation modes of the receiver. These setting items comprise "BEGINNER MODE", "FONT", "FONT SIZE", . . . which are enumerated in the left column and on its right side, the specific operation modes corresponding to these setting items are enumerated. In this list, the currently selected operation mode is indicated by the black-and-white reversed cursor. The operation modes are all defaulted to a recommended mode beforehand; the user, however, can operate the direction keys 37 to move the cursor and fix it using the ENTER key 38 in order to select his desired operation mode, thus customizing the receiver 1.

FIGS. 4(a) and 4(b) show respectively show the display of cases where, for example, one user makes user 0 setting to select a font "LIGHT AND DARKNESS" and another user makes user 1 setting to select a font "GOTHIC" and they provide OSD display of their respective channel information on the display device. Thus, each user can select a font that he feels easy to see. Also, FIGS. 5(a) and 5(b) respectively show the display of cases where one user makes user 0 setting to select a font size "MEDIUM" and another user makes user 2 setting to select a font size "LARGE" and they provide OSD display of their respective channel information on the display device. As can be seen from these cases, when the font size is changed, the amount of the information displayed on one display is decreased but the font size is increased, so that the display becomes easy to see. Further, FIGS. 6(a) and 6(b) respectively show the display of cases where one user makes user 3 setting to select a font color "BLACK" and a background color "BLUE" and another user makes user 0 setting to select a font color "BLACK" and a background color "WHITE" and they provide OSD display of respective channel information on the display device. Thus, the users can change the font color and the background color to select such a color combination that they feel easy to see.

Thus, each user can select his own operation mode in each setting item and operate the ENTER key 38 on the remote controller 30, to thereby the control unit 8 stores thus set operation mode in the memory 7. In this step, to guard against an abuse or mistake in setting, such countermeasure may be taken that the user should enter his user ID or password. Note here that this user setting is valid permanently once stored in the memory 7 and so the setting display shown in FIG. 3 need not be displayed unless the setting is changed.

Next, a procedure according to this embodiment for switching the operation mode by selecting the user setting is described as follows. As mentioned above, the user operates the remote controller 30 beforehand to set his own preferential operation mode of the receiver 1. Then, he assigns his desired selection number to this user setting and stores it in the memory 7. This selection number is adapted to take on the number of a channel through which nothing is broadcast so that this channel number may be discriminated from the number of a receivable channel obtained from the channel information. For example, it is preferable to employ such an easy-to-remember number as a three-digit number including "555" or "777" (input pattern). When the user operates the numeric key 33 to enter a selection number while an broadcasting image is being received, the control unit 8 refers to the memory 7 to select a user setting assigned this entered selection number. When the user has entered a channel number, the current channel is changed to a channel corresponding to this channel number.

Figure 7:
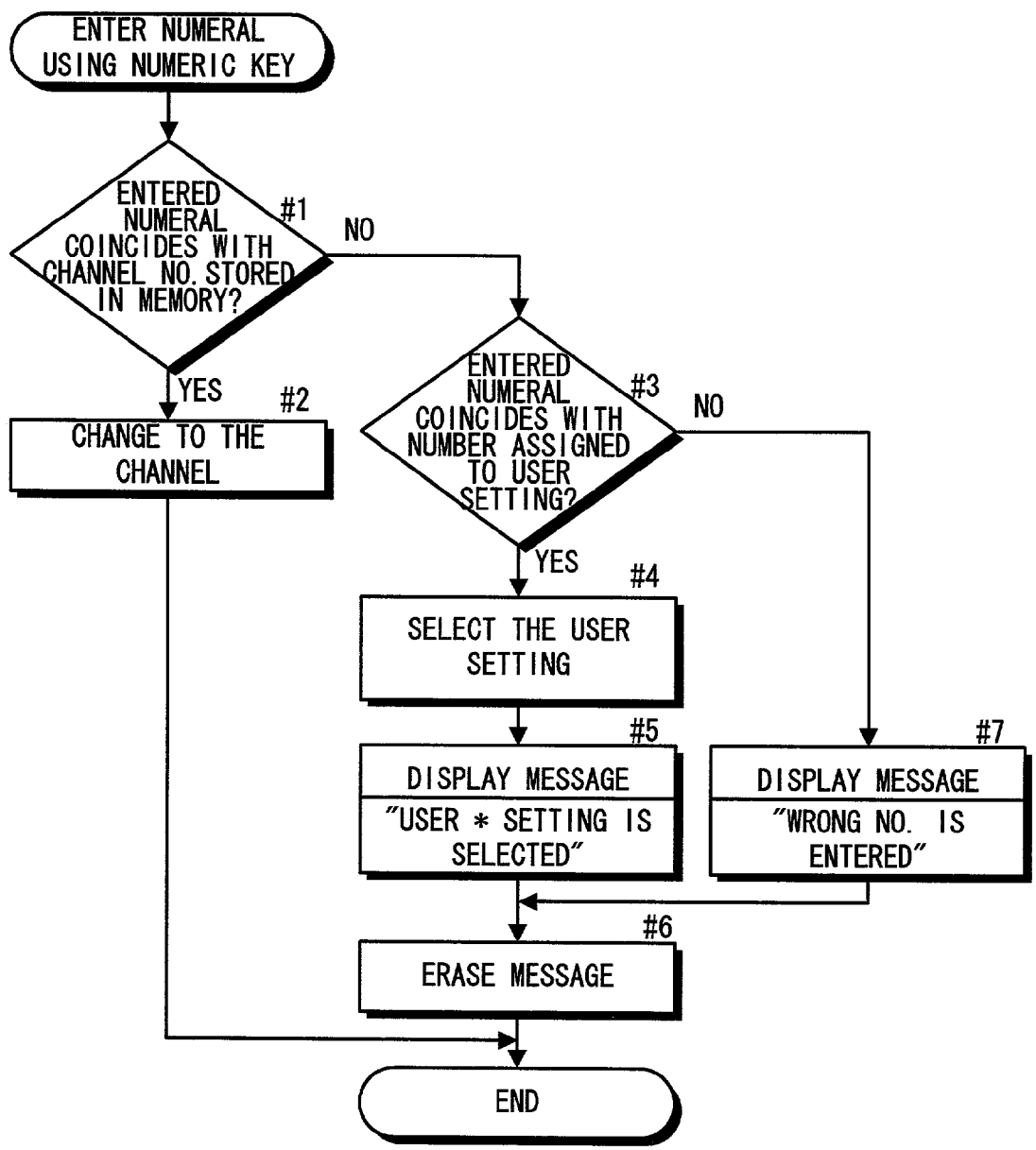
FIG. 7 is a flowchart for showing processing of a control unit when a key on a numeric key is pressed in the receiver.

The following will describe the processing of operations of the control unit 8 when the user presses any key on the numeric key while an broadcasting image is displayed as described above with reference to FIG. 7. First, the system decides whether the above-mentioned number coincides with a channel number stored in the memory and, if they coincide, (YES is answered at #1), changes the current channel to the corresponding channel (#2) and then ends the processing. If they do not coincide (NO is answered at #1), on the other hand, the system decides whether the entered number has been assigned to a user setting and, if that is the case (YES is answered at #3), selects that user setting (#4) and gives a message to that effect in an OSD display (#5) and, when a predetermined time lapse has elapsed afterward, erases the message from the display (#6) and then ends the processing. If the entered number has not been assigned to a user setting (NO is answered at #3), on the other hand, the system gives OSD display of a message to that effect (#7) and goes to #6. Note here that the message need not be displayed at #5 or #7 in particular.

Thus, by this embodiment, it is possible to select a user setting easily by entering the corresponding selection number through the numeric key 33. Therefore, the current mode can be switched to a desired operation mode for each setting item easily and at a time. Also, since the existing numeric key 33 is used, new hardware need not be assigned, thus enable suppressing down the manufacturing costs of the receiver. Also, since a selection number entered at a time of the user setting is assigned a numeral different from the channel number, the user can discriminate between the channel number and the selection number in the entry operation. Further, this entry operation is carried out only by using the numeric key 33 without displaying the menu list display, so that the user need not interrupt the display of an image output to the display device. Therefore, the user can select the user setting and switch the operation mode as enjoying viewing an image, so that an efficient interface can be realized.

Second Embodiment

The following will a digital/analog broadcasting receiver according to another embodiment of the invention. The configuration of the receiver shown in FIG. 1, the configuration of the remote controller shown in FIG. 2, the user setting display shown in FIG. 3, and the OSD display shown in FIGS. 4-6 are the same as those by the first embodiment and so their explanation is omitted to describe only the switch-over of the operation mode by selection of the user setting. As mentioned above, the user can operate the remote controller 30 beforehand to set his own preferential operation mode of the receiver 1 and then make a user setting. Then, he assigns a desired one of the direction keys 37 to this user setting and stores it in the memory 7. If the user presses any one of the direction keys 37 with the menu key 35 held down, the control unit 8 refers to the memory 7 to select a user setting assigned that one of the direction keys 37. Note here that when the menu key 35 is pressed alone, the above-mentioned menu display appears. Therefore, by this embodiment, it is possible to make user settings for four users corresponding to the UP/DOWN keys 37a/37b and the RIGHT/LEFT keys 37c/37d.

Figure 8:
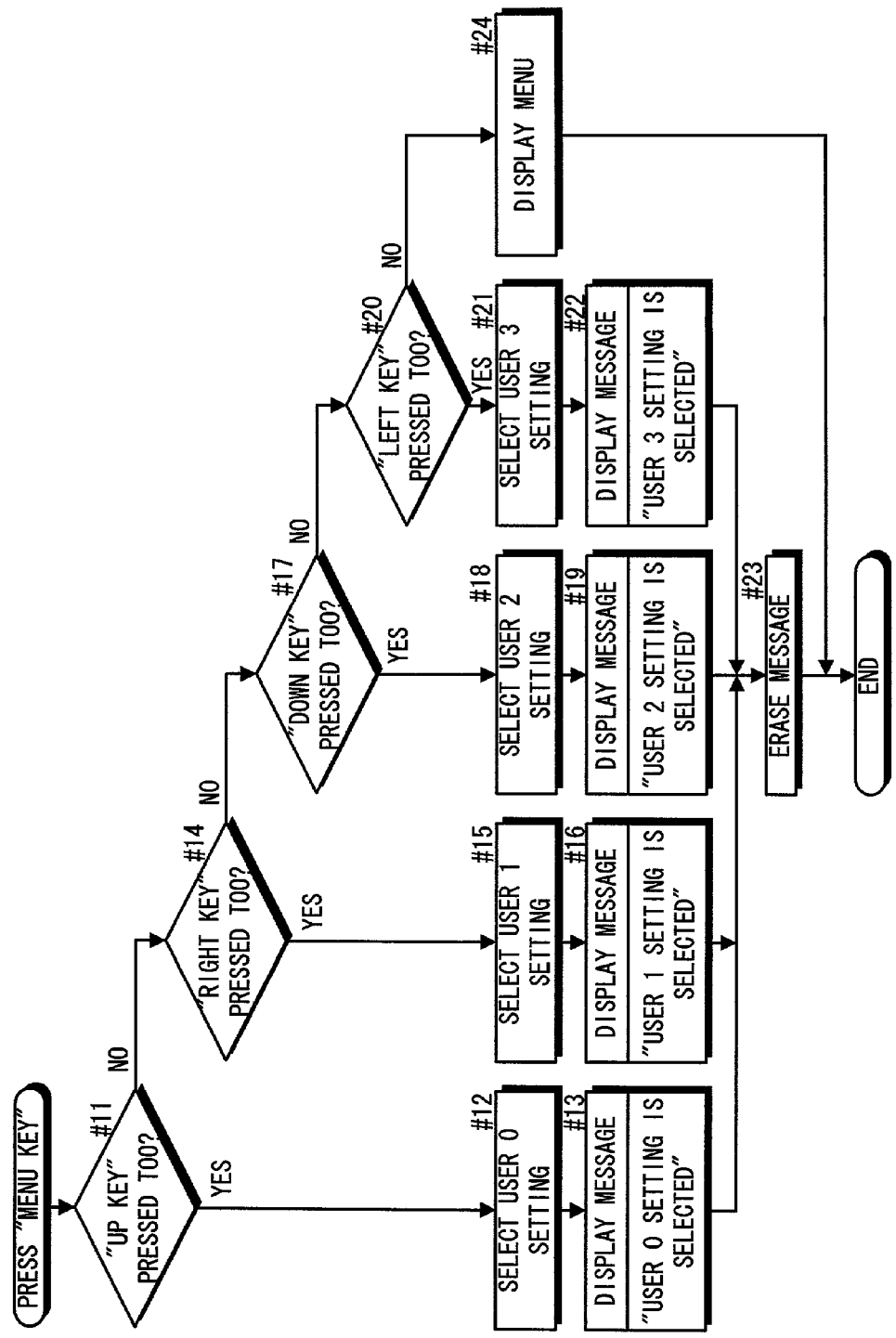
FIG. 8 is a flowchart for showing processing of the control unit when a menu key is pressed in the broadcasting receiver according to another embodiment of the invention.

The following will describe the processing of operations by the control unit when the menu key 35 is pressed while the image is displayed as mentioned above, with reference to FIG. 8. When the user presses the UP key 37a with the menu key 35 held down (YES is answered at #11), the system selects a user setting 0 (#12) and gives OSD display of a message to that effect on the display 12 (#13). Also, when the user does not press the UP key 37a (NO is answered at #11) but presses the RIGHT key 37d with the menu key 35 held down (YES is answered at #14), the system selects user setting 1 (#15) and gives OSD display of a message to that effect on the display 12 (#16). Further, when the user does not press the RIGHT key 37d (NO is answered at #14) but presses the DOWN key 37b with the menu key 35 held down (YES is answered at #17), the system selects user setting 2 (#18) and gives OSD display of an message on the display 12 (#19). Still further, when the user does not press the DOWN key 37b (NO is answered at #17) but presses the LEFT key 37c with the menu key 35 held down (YES is answered at #20), the system selects user setting 3 (#21) and gives OSD display of a message to that effect on the display 12 (#22). The system erases the messages given in OSD display at #13, #16, #19, and #22 when a certain time lapse has elapsed (#23) and then ends the processing. If none of the direction keys 37 is pressed with the menu key 35 held down (NO is answered at #20), the system decides that the menu key 35 has been pressed alone, to thereby display the menu display on the display 12 (#24) and then ends the processing. The message need not be displayed at #13, #16, #19, or #22.

Thus, by this embodiment, by using the menu key and the direction keys in entering of the selection number, the user setting can be selected. Therefore, for each of the setting items, desired operation modes can be switched easily and at a time. Also, since the existing menu key and the direction keys can be used, new hardware need not be assigned, thus suppressing down the manufacturing costs. Further, this user setting can be carried out only by using a predetermined operation key and direction keys without displaying the menu display, so that like by the first embodiment the user can make the user setting while enjoying viewing an image simultaneously, so that an efficient interface can be realized.

Third Embodiment

The following will describe a digital/analog broadcasting receiver according to a third embodiment of the invention. The configuration of the receiver shown in FIG. 1, the configuration of the remote controller shown in FIG. 2, the user setting display shown in FIG. 3, and the OSD display shown in FIGS. 4-6 are the same as those by the first embodiment and so their explanation is omitted to describe only the switch-over of the operation mode by selection of the user setting. As mentioned above, the user can operate the remote controller 30 beforehand to set his own preferential operation mode of the receiver 1 and then make a user setting. Then, he assigns a desired one of the numeral keys to this user setting and stores it in the memory 7. This selection number is adapted to take on a numeral of "0" through "9" so as to correspond to the keys on the numeric key 33 on the remote controller 30. When the user holds down any key on the numeric key 33 for at least a predetermined time lapse during receiving the image, the control unit 8 reference the memory 7 to select a user setting assigned thus entered selection number. The key on the numeric key 33 is held down for less than the predetermined time lapse, the system decides it to be channel change and changes the current channel to the corresponding channel.

The following will describe the processing of operations by the control unit 8 when the user presses any key on the numeric key with reference to FIG. 9. The control unit 8 detects a time lapse for which the key on the numeric key was held down continuously and, if the time lapse is not less than a predetermined one (YES is answered at #31), refers to the memory 7 to decides whether this entered number coincides with a number assigned to a user setting and, if they coincide (YES is answered at #32), selects that user setting (#33) and gives OSD display of a message to that effect on the display 12 (#34). If they do not coincide at #32, on the other hand, the system gives OSD display of a message to that effect on the display 12 (#35). The system erases the messages displayed in an OSD manner at #34 or #35 when a predetermined time has elapsed (#36) and then ends the processing. Also, if the continuous time lapse for which the key on the numeric key was held down is less than the predetermined time (NO is answered at #31), the system searches the memory 7 for such a channel number stored therein that coincides with the number entered through the numeric key 33 and, if such a channel number is found (YES is answered at #37), changes the current channel to the corresponding channel (#38) and then ends the processing. If such a channel number cannot be found (NO is answered at #37), on the other hand, the system gives OSD display of a message to that effect on the display 12 (#35). Note here that the messages need not be displayed at #34 or #35 in particular.

Thus, according to this embodiment, by using the numeric key 33 in entering of the selection number, the user setting can be selected. Therefore, for each of the setting items, desired operation modes can be switched easily and at a time. Also, since the existing numeric key 33 is used, the manufacturing costs can be suppressed down. Further, this user setting can be selected only by setting the above-mentioned predetermined time lapses appropriately, so that the user can make the user setting in discrimination from the entering of the channel number. Further, this operation can be carried out only by using the numeric key 33 without displaying the menu display, so that like by the first embodiment, the user can make the user setting while enjoying viewing an image simultaneously, so that an efficient interface can be realized.

It should be noted that the invention is not limited to the above-mentioned embodiments but may be subject to a variety of variants; for example, the broadcasting receiver is not limited to such that corresponds to a digital broadcast according to the ATSC standard but may be applied to a wide variety of types of receivers for receiving other digital/analog broadcasts. Also, the receiver 1 may be built in the body of a television or a video cassette recorder (VCR).

Also, in a broadcasting receiver according to the second embodiment, not only the menu key 35 can be used together with the direction keys 37 but also, for example, such an operation key as the ENTER key 38 can be used together with it. If a plurality of such operation keys are used together with the direction keys 37, more than four users can set their own operation modes. Further, in a broadcasting receiver according to the third embodiment, a predetermined time which constitutes a criterion for an operation mode selection instruction (see #31 in FIG. 9) may be defined otherwise by the user himself.

What is claimed is:

1. A digital/analog broadcasting receiver comprising:
   a receiver for receiving an encoded digital/analog broadcasting signal originated from a broadcasting station;
   a digital/analog decoder for decoding the digital/analog broadcasting signal received from the receiver and then outputting the signal to a display which displays an image;
   a memory for storing channel information contained in the broadcasting signal decoded by the digital decoder;
   a control unit for controlling each of the other sections of the receiver; and
   an input device for a user to input an operation instruction to the control unit,
   wherein the control unit has a function to set and select an operation mode of the receiver for each user based on inputs by a plurality of users who use the input device,
   wherein the input device has a numeral inputting key for inputting a numeral when the operation mode is selected;
   wherein the control unit assigns a predetermined selection number input by the user to the set operation mode and stores the selection number and the operation mode in correlation with each other in the memory,
   wherein the control unit compares a number of the numeral inputting key entered by the user with a channel number stored the memory to determine whether the number of the numeral inputting key coincides with the channel number stored in memory, and
   wherein when the number of the numeral inputting key does not coincide with a channel number stored in the memory, the control unit refers to the memory to select the operation mode that corresponds to the selection number thus entered.

2. The digital/analog broadcasting receiver according to claim 1, wherein when the number of the numeral inputting key coincides with a channel number stored in the memory, the control unit causes a tuner to receive a channel corresponding to the channel number is selected.

3. The digital/analog broadcasting receiver according to claim 2, further comprising an on-screen display (OSD) for displaying the channel information on the display connected to the receiver, wherein the operation mode is adapted to set a font type, size, and display color of the channel information displayed on the OSD display and a background display color individually for each user.

4. The digital/analog broadcasting receiver according to claim 2, wherein when the control unit selects the operation mode when a broadcasting image is output to the display, the user has operated the numeral inputting key to enter the selection number and the number of the numeral inputting key does not coincide with a channel number stored in the memory.

5. A method comprising:
- storing, in a memory of a broadcast receiver, an assignment of a predetermined selection number to an operation mode;
- receiving, by the broadcast receiver from an input device, a number of a numeral inputting key;
- comparing, by the broadcast receiver, the number of the numeral inputting key with a channel number stored the memory to determine whether the number of the numeral inputting key coincides with the channel number stored in memory; and
- selecting an operation mode that corresponds to the number of the numeral inputting key when the number of the numeral inputting key does not coincide with a channel number stored in the memory.

6. The method of claim 5, wherein when the number of the numeral inputting key coincides with a channel number stored in the memory, a tuner selects a channel corresponding to the channel number.

7. The method of claim 6, wherein the operation mode sets a font type, size, and display color of the channel information displayed on an onscreen display (OSD) display and a background display color individually for each of a plurality of users.

* * * * *